United States Patent
Li

(10) Patent No.: US 12,167,402 B2
(45) Date of Patent: Dec. 10, 2024

(54) METHODS FOR TRANSMITTING HYBRID AUTOMATIC REPEAT REQUEST ACKNOWLEDGEMENT AND DEVICE

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 368 days.

(21) Appl. No.: 17/774,015

(22) PCT Filed: Nov. 5, 2019

(86) PCT No.: PCT/CN2019/115775
§ 371 (c)(1),
(2) Date: May 3, 2022

(87) PCT Pub. No.: WO2021/087766
PCT Pub. Date: May 14, 2021

(65) Prior Publication Data
US 2023/0007648 A1    Jan. 5, 2023

(51) Int. Cl.
*H04W 72/04* (2023.01)
*H04L 1/18* (2023.01)
(Continued)

(52) U.S. Cl.
CPC .......... *H04W 72/21* (2023.01); *H04L 1/1861* (2013.01); *H04W 72/044* (2013.01)

(58) Field of Classification Search
None
See application file for complete search history.

(56) References Cited

U.S. PATENT DOCUMENTS

| 2019/0045546 A1 | 2/2019 | Li |
| 2020/0367265 A1 | 11/2020 | Wang et al. |

(Continued)

FOREIGN PATENT DOCUMENTS

| CN | 109155726 A | 1/2019 |
| CN | 109547170 A | 3/2019 |

(Continued)

OTHER PUBLICATIONS

Intellectual property India, Office Action Issued in Application No. 202247031520, Sep. 27, 2022, 6 pages. (Submitted with Partial Machine Translation).

(Continued)

*Primary Examiner* — Scott M Sciacca
(74) *Attorney, Agent, or Firm* — Volpe Koenig

(57) ABSTRACT

The present disclosure provides a method for transmitting a HARQ-ACK and a communication device. The method includes: in a case that there is an overlap between a PUCCH resource carrying an eMBB HARQ-ACK and an eMBB PUSCH resource in a time domain, in response to determining, before a predetermined moment that, there is an overlap between the PUCCH resource carrying an URLLC HARQ-ACK and the eMBB PUSCH resource in the time domain while there is no overlap between the PUCCH resource carrying the URLLC HARQ-ACK and the PUCCH resource of the eMBB HARQ-ACK in the time domain, the eMBB HARQ-ACK on the PUCCH resource of the eMBB HARQ-ACK is transmitted, wherein the predetermined moment is an earlier one of a time domain start moment of the eMBB PUSCH resource and a time domain start moment of the PUCCH resource carrying the eMBB HARQ-ACK.

11 Claims, 6 Drawing Sheets

(51) Int. Cl.
*H04L 1/1829* (2023.01)
*H04W 72/044* (2023.01)
*H04W 72/21* (2023.01)

(56) References Cited

U.S. PATENT DOCUMENTS

2020/0403735 A1   12/2020  Zhao
2022/0225413 A1*  7/2022  Yoshioka ............ H04W 72/569
2022/0295473 A1*  9/2022  Yin ....................... H04L 1/1812

FOREIGN PATENT DOCUMENTS

| | | |
|---|---|---|
| CN | 109802819 A | 5/2019 |
| CN | 110024467 A | 7/2019 |
| KR | 20180107417 A | 10/2018 |
| WO | 2019/005920 A1 | 1/2019 |
| WO | 2019/070706 A1 | 4/2019 |
| WO | 2020/198467 A1 | 10/2020 |

OTHER PUBLICATIONS

European Patent Office, Extended European Search Report Issued in Application No. 19952024.8, Nov. 11, 2022, Germany, 8 pages.
ISA State Intellectual Property Office of the People's Republic of China, Written Opinion of the International Searching Authority Issued in Application No. PCT/CN2019/115775, Jul. 23, 2020, WIPO, 6 pages.
ISA State Intellectual Property Office of the People's Republic of China, International Search Report Issued in Application No. PCT/CN2019/115775, Jul. 23, 2020, WIPO, 4 pages.

* cited by examiner

METHODS FOR TRANSMITTING HYBRID AUTOMATIC REPEAT REQUEST ACKNOWLEDGEMENT AND DEVICE

CROSS REFERENCE TO RELATED APPLICATIONS

This application is the national phase of International Application No. PCT/CN2019/115775 filed on Nov. 5, 2019, the disclosure of which is hereby incorporated by reference in its entirety.

TECHNICAL FIELD

Embodiments of the present disclosure relate to the field of wireless communication technologies, but are not limited to the field of wireless communication technologies, and in particular to methods and apparatuses for transmitting a Hybrid Automatic Repeat reQuest ACKnowledgement (HARQ-ACK), devices and medium.

BACKGROUND

In a New Radio (NR) of a fifth generation (5th Generation, 5G) cellular mobile communication, an Ultra Reliable and Low Latency Communication (URLLC) service is a very important service type, and will be widely used in 5G scenarios such as factory automation, remote control, Augment Reality (AR)/Virtual Reality (VR), and the like. The URLLC service usually requires very high reliability and very low delay. In addition, there is another type of service, an enhanced Mobile Boardband (eMBB), which usually requires a relatively large bandwidth and requirements for the reliability and delay are relatively loose, and a service priority of the eMBB is usually shorter than that of the URLLC.

It is found in an application process that an eMBB HARQ-ACK may be lost, which will cause a base station to repeatedly send unnecessary eMBB service data.

SUMMARY

Embodiments of the present disclosure disclose a method and apparatus for transmitting a hybrid automatic repeat request acknowledgement, a communication device and a computer non-transitory storage medium.

According to a first aspect of the embodiments of the present disclosure, there is provided a method for transmitting a HARQ-ACK, performed by User Equipment (UE), including:

in a case that there is an overlap between a PUCCH resource carrying an eMBB HARQ-ACK and an eMBB PUSCH resource in a time domain, in response to determining, before a predetermined moment, that there is an overlap between the PUCCH resource carrying an URLLC HARQ-ACK and the eMBB PUSCH resource in the time domain there is no overlap between the PUCCH resource carrying the URLLC HARQ-ACK and the PUCCH resource of the eMBB HARQ-ACK in the time domain, transmitting the eMBB HARQ-ACK on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK.

Based on the foregoing solution, the method further includes:
  determining a first time domain resource position of the PUCCH resource carrying the eMBB HARQ-ACK;
  determining a second time domain resource position of the eMBB PUSCH resource; and
  determining whether there is an overlap between the PUCCH resource carrying the eMBB HARQ-ACK and the eMBB PUSCH resource in the time domain based on the first time domain resource position and the second time domain resource position.

Based on the foregoing solution, the method further includes:
  determining a third time domain resource position of the PUCCH resource carrying the URLLC HARQ-ACK;
  determining whether there is an overlap between the PUCCH resource carrying the URLLC HARQ-ACK and the PUCCH resource carrying the eMBB HARQ-ACK in the time domain based on the first time domain resource position and the third time domain resource position; and
  determining whether there is an overlap between the PUCCH resource carrying the URLLC HARQ-ACK and the eMBB PUSCH resource in the time domain based on the second time domain resource position and the third time domain resource position.

Based on the foregoing solution, the method further includes:
  in response to dynamic scheduling of an URLLC physical downlink shared channel (PDSCH) resource, obtaining a determination moment according to a reception moment and a demodulation duration of an uplink scheduling instruction for scheduling the URLLC PDSCH resource, wherein the demodulation duration is a duration for the UE to demodulate the uplink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

Based on the foregoing solution, the demodulation duration is a predetermined number of symbols.

Based on the foregoing solution, the method further includes: determining the demodulation duration, wherein the determining the demodulation duration includes one of:
  determining the demodulation duration according to a protocol;
  determining the demodulation duration according to received configuration information.

Based on the foregoing solution, the method further includes:
  dropping or punching the eMBB PUSCH resource.

According to a second aspect of the embodiments of the present disclosure, there is provided a method for transmitting a HARQ-ACK, performed by a base station, including:
  in a case that there is an overlap between a physical uplink control channel (PUCCH) resource carrying an enhanced mobile broadband (eMBB) HARQ-ACK and an eMBB physical uplink shared channel (PUSCH) resource in a time domain, in response to determining, before a predetermined moment, that there is an overlap between the PUCCH resource carrying an ultra reliable and low latency communication (URLLC) HARQ-ACK and the eMBB PUSCH resource in the time domain there is no overlap between the PUCCH resource carrying the URLLC HARQ-ACK and the PUCCH resource of the eMBB HARQ-ACK in the time domain, determining that user equipment (UE) receives the eMBB HARQ-ACK on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK.

Based on the foregoing solution, the method further includes:
  determining a first time domain resource position of the PUCCH resource carrying the eMBB HARQ-ACK;
  determining a second time domain resource position of the eMBB PUSCH resource; and
  determining whether there is an overlap between the PUCCH resource carrying the eMBB HARQ-ACK and the eMBB PUSCH resource in the time domain based on the first time domain resource position and the second time domain resource position.

Based on the foregoing solution, the method further includes:
  determining a third time domain resource position of the PUCCH resource carrying the URLLC HARQ-ACK;
  determining whether there is an overlap between the PUCCH resource carrying the URLLC HARQ-ACK and the PUCCH resource carrying the eMBB HARQ-ACK in the time domain based on the first time domain resource position and the third time domain resource position; and
  determining whether there is an overlap between the PUCCH resource carrying the URLLC HARQ-ACK and the eMBB PUSCH resource in the time domain based on the second time domain resource position and the third time domain resource position.

Based on the foregoing solution, the method further includes:
  in response to dynamic scheduling of an URLLC physical downlink shared channel (PDSCH) resource, obtaining a determination moment of the UE according to a delivery moment and a demodulation duration of an uplink scheduling instruction for scheduling the URLLC PDSCH resource, wherein the demodulation duration is a duration for the UE to demodulate the uplink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

Based on the foregoing solution, the method further includes:
  dropping or punching the eMBB PUSCH resource.

According to a third aspect of the embodiments of the present disclosure, there is provided an apparatus for transmitting a hybrid automatic repeat request acknowledgement (HARQ-ACK), performed by user equipment (UE), including:
  a first transmitting module configured to, in a case that there is an overlap between a PUCCH resource carrying an eMBB HARQ-ACK and an eMBB PUSCH resource in a time domain, in response to determining, before a predetermined moment that there is an overlap between the PUCCH resource carrying an URLLC HARQ-ACK and the eMBB PUSCH resource in the time domain there is no overlap between the PUCCH resource carrying the URLLC HARQ-ACK and the PUCCH resource of the eMBB HARQ-ACK in the time domain, transmit the eMBB HARQ-ACK on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK.

Based on the foregoing solution, the apparatus further includes:
  a first determining module configured to determine a first time domain resource position of the PUCCH resource carrying the eMBB HARQ-ACK;
  a second determining module configured to determine a second time domain resource position of the eMBB PUSCH resource; and
  a third determining module configured to determine whether there is an overlap between the PUCCH resource carrying the eMBB HARQ-ACK and the eMBB PUSCH resource based on the first time domain resource position and the second time domain resource position.

Based on the foregoing solution, the apparatus further includes:
  a fourth determining module configured to determine a third time domain resource position of the PUCCH resource carrying the URLLC HARQ-ACK; and
  a fifth determining module configured to determine whether there is an overlap between the PUCCH resource carrying the URLLC HARQ-ACK and the PUCCH resource carrying the eMBB HARQ-ACK based on the first time domain resource position and the third time domain resource position; and
  to determine whether there is an overlap between the PUCCH resource carrying the URLLC HARQ-ACK and the eMBB PUSCH resource in the time domain based on the second time domain resource position and the third time domain resource position.

Based on the foregoing solution, the apparatus further includes:
  a first obtaining module configured to, in response to dynamic scheduling of an URLLC physical downlink shared channel (PDSCH) resource, obtain a determination moment according to a reception moment and a demodulation duration of an uplink scheduling instruction for scheduling the URLLC PDSCH resource, wherein the demodulation duration is a duration for the UE to demodulate the uplink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

Based on the foregoing solution, the demodulation duration is a predetermined number of symbols.

Based on the foregoing solution, the apparatus further includes:
  a sixth determining module configured to determine the demodulation duration, wherein the determining the demodulation duration includes one of:
  determining the demodulation duration according to a protocol;
  determining the demodulation duration according to received configuration information.

Based on the foregoing solution, the apparatus further includes:
a first resource processing module configured to drop or punch the eMBB PUSCH resource.

According to a fourth aspect of the embodiments of the present disclosure, there is provided an apparatus for transmitting a HARQ-ACK, performed by a base station, including:
a first receiving module configured to, in a case that there is an overlap between a physical uplink control channel (PUCCH) resource carrying an enhanced mobile broadband (eMBB) HARQ-ACK and an eMBB physical uplink shared channel (PUSCH) resource in a time domain, in response to determining, before a predetermined moment, that there is an overlap between the PUCCH resource carrying an ultra reliable and low latency communication (URLLC) HARQ-ACK and the eMBB PUSCH resource in the time domain while there is no overlap between the PUCCH resource carrying the URLLC HARQ-ACK and the PUCCH resource of the eMBB HARQ-ACK in the time domain, determine that user equipment (UE) receives the eMBB HARQ-ACK on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK.

Based on the foregoing solution, the apparatus further includes:
a second obtaining module configured to, in response to dynamic scheduling of an URLLC physical downlink shared channel (PDSCH) resource, obtain a determination moment of the UE according to a delivery moment and a demodulation duration of an uplink scheduling instruction for scheduling the URLLC PDSCH resource, wherein the demodulation duration is a duration for the UE to demodulate the uplink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

Based on the foregoing solution, the apparatus further includes:
a second resource processing module configured to drop or punch the eMBB PUSCH resource.

According to a fifth aspect of the embodiments of the present disclosure, there is provided a communication device, including:
a transceiver;
a memory; and
a processor, respectively connected to the transceiver and the memory, for controlling the transceiver to send and receive wireless signals by executing computer-executable instructions stored in the memory, and implementing the method provided by any technical solution of the first or second aspect.

According to a sixth aspect of the embodiments of the present disclosure, there is provided a computer non-transitory storage medium storing computer-executable instructions, when executed by a processor, the computer-executable instructions implement the method provided by any technical solution of the first or second aspect.

According to technical solutions provided by the embodiments of the present disclosure, in a case that there is an overlap between a PUCCH resource carrying an eMBB HARQ-ACK and an eMBB PUSCH resource in the time domain, if it is determined, before an earlier one of a time domain start moment of the eMBB PUSCH resource and a time domain start moment of the PUCCH resource carrying the eMBB HARQ-ACK, that there is an overlap between the PUCCH resource carrying an URLLC HARQ-ACK and the eMBB PUSCH resource in the time domain while there is no overlap between the PUCCH resource carrying the URLLC HARQ-ACK and the PUCCH resource of the eMBB HARQ-ACK in the time domain, the UE will still use the PUCCH resource to transmit the eMBB HARQ-ACK, instead of transmitting the eMBB HARQ-ACK by using the eMBB PUSCH resource in a multiplex manner, which reduces the loss of the eMBB HARQ-ACK caused by dropping or punching the eMBB PUSCH resource due to a burst URLLC HARQ-ACK, thereby reducing retransmission of unnecessary eMBB service data by the base station.

DETAILED DESCRIPTION OF THE EMBODIMENTS

Exemplary embodiments will be described in detail here, examples of which are illustrated in the accompanying drawings. When the following description refers to the drawings, unless otherwise indicated, the same numerals in different drawings indicate the same or similar elements. The implementations set forth in the following description of exemplary embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only adopted for the purpose of describing specific embodiments and not intended to limit the embodiments of the present disclosure. The singular forms "a", "the" and "this" used in the present disclosure and the appended claims are also intended to include plural forms, unless the context clearly indicates other meanings. It should also be understood that the term "and/or" as used in the present disclosure refers to and includes any and all possible combinations of one or more of the associated listed items.

It should be understood that, although terms first, second, third and the like may be adopted to describe various information in the embodiments of the present disclosure, the information should not be limited to these terms. These terms are only used to distinguish the same type of information. For example, first information may also be referred to as second information, and similarly, the second information may also be referred to as the first information without departing from the scope of the embodiments of the present disclosure. For example, terms "if" used herein may be explained as "while" or "when" or "responsive to determining", which depends on the context.

Figure 1:
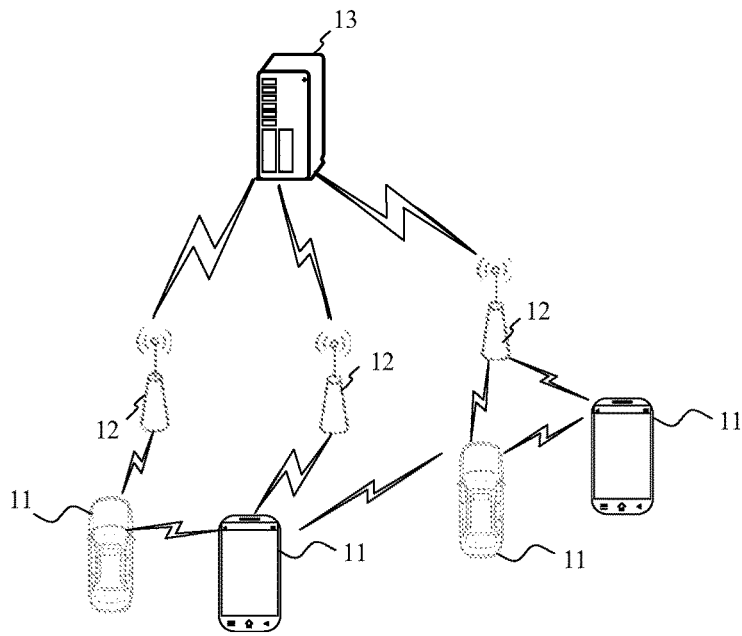
FIG. 1 is a schematic structural diagram illustrating a radio communication system according to an embodiment of the present disclosure.

Referring to FIG. 1, which is a schematic structural diagram illustrating a radio communication system according to an embodiment of the present disclosure. As shown in FIG. 1, the radio communication system is a cellular mobile communication technology-based communication system, and the radio communication system may include several UEs 11 and several base stations 12.

The UE 11 may be a device that provides voice and/or data connectivity to a user. The UE 11 may communicate with one or more core networks via a Radio Access Network (RAN). The UE 11 may be an Internet of Things (IoT) UE such as a sensor device, a mobile phone (or referred to as a "cellular" phone), and a computer having the IoT UE. For example, the UE 11 may be a fixed, portable, pocket-sized, handheld, computer-built-in, or vehicle-mounted device, for example, a Station (STA), a subscriber unit, a subscriber station, a mobile station, a mobile, a remote station, an access point, a remote terminal, an access terminal, a user terminal, a user agent, a user device, or user equipment (UE). Alternatively, the UE 11 may also be an unmanned aerial vehicle device. Alternatively, the UE 11 may also be a vehicle-mounted device, for example, a trip computer with a wireless communication function, or a wireless communication device connected to the trip computer. Alternatively, the UE 11 may also be a roadside device, for example, a street lamp, a signal lamp, or other roadside devices with a wireless communication function.

The base station 12 may be a network side device in a radio communication system. The radio communication system may be a 5G system, which is also referred to as a new radio (NR) system or a 5G NR system. Alternatively, the radio communication system may be a system supporting New Radio-Unlicensed (NR-U) spectrum communication. Alternatively, the radio communication system may be a next generation system of the 5G system. Herein, an access network in the 5G system can be called a New Generation-Radio Access Network (NG-RAN).

The base station 12 may be a base station (gNB) having a centralized-distributed architecture in the 5G system. When the base station 12 adopts a centralized-distributed architecture, the base station 12 typically includes a Central Unit (CU) and at least two Distributed Units (DUs). Protocol stacks of a Packet Data Convergence Protocol (PDCP) layer, a Radio Link Control (RLC) layer, and a Media Access Control (MAC) layer are set in the central unit. A protocol stack of a Physical (PHY) layer is set in the distributed unit, and the specific implementation of the base station 12 is not limited in the embodiments of the present disclosure.

A wireless connection may be established between the base station 12 and the UE 11 through a radio air interface. In various embodiments, the radio air interface is a radio air interface based on the fifth generation mobile communication network technology (5G) standard. For example, the radio air interface is the New Radio; alternatively, the radio air interface may be a radio air interface based on the next generation mobile communication network technical standard of 5G.

In some embodiments, an E2E (End to End) connection may also be established among the UEs 11. In some embodiments, the above radio communication system may further include a network management device 13.

Several base stations 12 are respectively connected to the network management device 13. Herein, the network management device 13 may be a core network device in a radio communication system. For example, the network management device 13 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF), or a Home Subscriber Server (HSS). The implementation of the network management device 13 is not limited by the embodiments of the present disclosure.

In the 5G NR communication protocol, for the PUCCH resource carrying the HARQ-ACK and the PUSCH resource carrying data of the same service type, if the PUCCH resource overlaps with the PUSCH resource in a time domain, the PUCCH resource should be dropped, and the HARQ-ACK should be transmitted by using the PUSCH resource in a multiplex manner. However, if the HARQ-ACK PUCCH resource carrying the URLLC overlaps with the eMBB PUSCH resource in the time domain, the eMBB PUSCH resource will be dropped or partially dropped. If the eMBB HARQ-ACK is transmitted by using the eMBB PUSCH resource in a multiplex manner at this time, the carried eMBB HARQ-ACK may be dropped or partially dropped, resulting in the base station not receiving or correctly receiving the HARQ of the eMBB service fed back by the UE, thereby causing retransmission of unnecessary eMBB service data.

If both the PUCCH resource carrying the URLLC HARQ-ACK and the PUCCH resource carrying the eMBB HARQ-ACK overlap with the eMBB PUSCH resource in the time domain, but the PUCCH resource carrying the URLLC HARQ-ACK does not overlap with the PUCCH resource carrying the eMBB HARQ-ACK in the time domain, transmitting the eMBB HARQ-ACK by using the eMBB PUSCH resource in a multiplex manner may cause the eMBB HARQ-ACK to be dropped or partially dropped.

Figure 2:
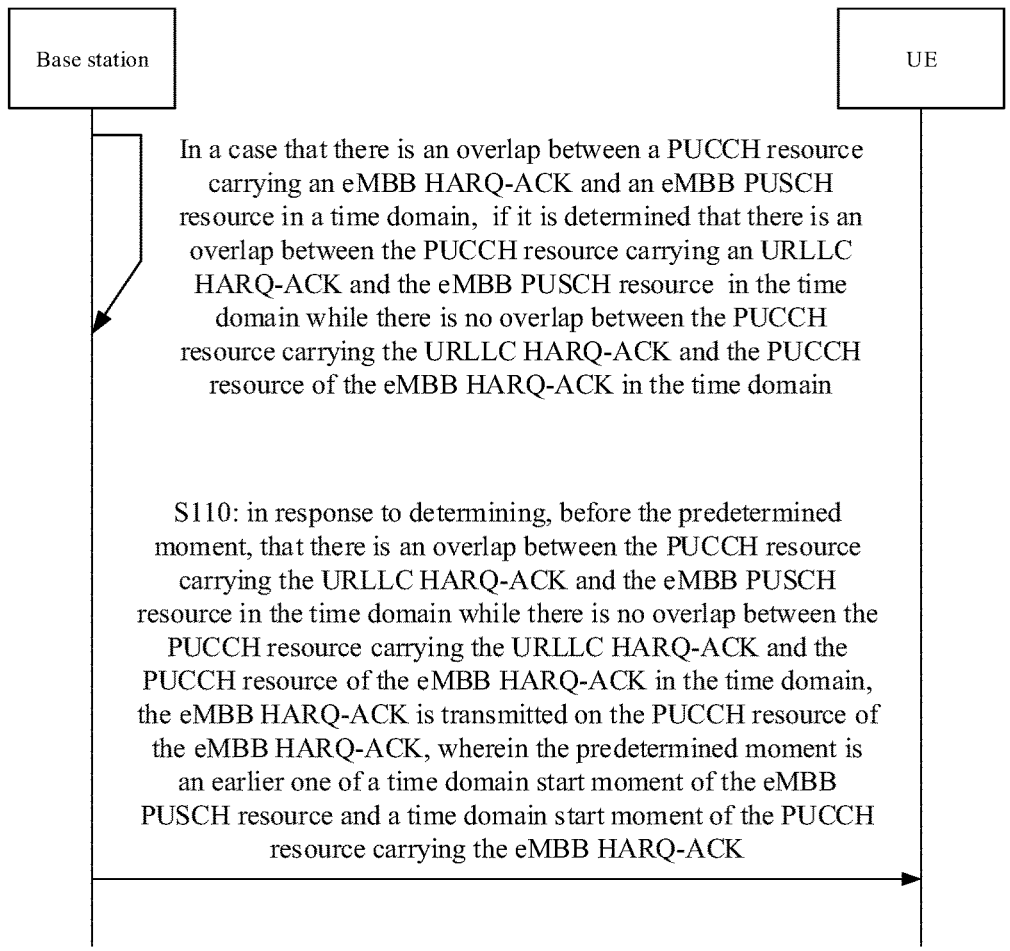
FIG. 2 is a schematic flowchart illustrating a method for transmitting a HARQ-ACK according to an embodiment of the present disclosure.

As shown in FIG. 2, there is provided a method for transmitting a HARQ-ACK, performed by user equipment (UE), including:

S110: in a case that there is an overlap between a PUCCH resource carrying an eMBB HARQ-ACK and an eMBB PUSCH resource in a time domain, in response to determining, before a predetermined moment, that there is an overlap between the PUCCH resource carrying an URLLC HARQ-ACK and the eMBB PUSCH resource in the time domain while there is no overlap between the PUCCH resource carrying the URLLC HARQ-ACK and the PUCCH resource of the eMBB HARQ-ACK in the time domain, the eMBB HARQ-ACK is transmitted on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK.

In the embodiments of the present disclosure, the method is applied to various UEs. The UE may be a human-mounted mobile terminal and/or a vehicle-mounted mobile terminal. For example, the human-mounted mobile terminal may be a mobile phone, a tablet computer, a wearable device, or the like. The vehicle-mounted mobile terminal may include vehicle-mounted devices on vehicles such as private cars and buses.

The PUCCH resource is a communication resource allocated to the PUCCH, where the communication resource includes a time domain resource and a frequency domain resource.

The PUCCH resource carrying the eMBB HARQ-ACK is a communication resource scheduled on the PUCCH to transmit the eMBB HARQ-ACK. The eMBB HARQ-ACK is feedback information of downlink eMBB service data.

The PUCCH resource carrying the URLLC HARQ-ACK is a communication resource scheduled on the PUCCH to transmit the URLLC HARQ-ACK.

The eMBB PUSCH resource may be a PUSCH resource for the UE to upload the eMBB service data. Therefore, the UE can send the eMBB service data to the base station on a corresponding resource of the PUSCH.

The eMBB HARQ-ACK is feedback information for the eMBB service data transmitted on the PDSCH, and can be divided into an acknowledgement (ACK) and a non-acknowledgement (NACK). The ACK indicates that the data is successfully received, and the NACK indicates that the data fails to be received.

The URLLC HARQ-ACK is feedback information for the URLLC service data transmitted on the PDSCH, and can also be divided into the ACK and NACK.

If the PUCCH resource carrying the eMBB HARQ-ACK and the eMBB PUSCH resource overlap in time domain, it will be further determined whether the PUCCH resource carrying the URLLC HARQ-ACK overlaps with the eMBB PUSCH resource and the PUCCH resource carrying the eMBB HARQ-ACK in the time domain, respectively; namely, whether there is an overlapping relationship between the PUCCH resource carrying the URLLC HARQ-ACK and the eMBB PUSCH resource in the time domain, and whether there is an overlapping relationship between the PUCCH resource carrying the URLLC HARQ-ACK and the PUCCH resource carrying the eMBB HARQ-ACK in the time domain.

The overlapping relationship includes overlap in the time domain and no overlap in the time domain. Herein, the overlap in the time domain means that times occupied by the two resources have an overlapping part, and the no overlap in the time domain means that the times occupied by the two resources have no overlapping part.

The predetermined moment is a relatively early one of a time domain start moment of the eMBB PUSCH resource and a time domain start moment of the PUCCH resource carrying the eMBB HARQ-ACK. For example, if the start moment of the eMBB PUSCH resource is earlier than that of the PUCCH resource carrying the eMBB HARQ-ACK, the predetermined moment is the start moment of the eMBB PUSCH resource; and if the start moment of the eMBB PUSCH resource is later than that of the PUCCH resource carrying the eMBB HARQ-ACK, the predetermined moment is the start moment of the PUCCH resource carrying the eMBB HARQ-ACK.

Referring to FIG. 8 to FIG. 11, a start position of the PUCCH resource carrying the eMBB HARQ-ACK is compared with that of the eMBB PUSCH resource in the time domain to determine the earlier one.

Since a delay of an URLLC service is shorter than that of an eMBB service, when the URLLC HARQ-ACK is transmitted, if the limitation of the transmit power of the UE and/or the UE transmitting the URLLC HARQ-ACK and the eMBB service data on the PUSCH resource simultaneously at one point in time leads to high power consumption, the UE may drop the eMBB PUSCH resource; at this time, if the eMBB HARQ-ACK is still transmitted by using the eMBB PUSCH resource in a multiplex manner, the base station will not receive the eMBB HARQ-ACK, thereby causing downlink retransmission of unnecessary eMBB service data by the base station.

In view of this, if the PUCCH resource carrying the URLLC HARQ-ACK overlaps with the eMBB PUSCH resource and the PUCCH resource carrying the eMBB HARQ-ACK also overlaps with the eMBB PUSCH resource, in order to ensure the timely transmission of the eMBB HARQ-ACK, the eMBB HARQ-ACK will not be transmitted by using the eMBB PUSCH resource in a multiplex manner, but it is further determined whether to drop the PUCCH resource carrying the eMBB HARQ-ACK according to the overlapping relationship between the PUCCH resource carrying the eMBB HARQ-ACK and the PUCCH resource carrying the URLLC HARQ-ACK in the time domain. If there is no overlap between the PUCCH resource carrying the eMBB HARQ-ACK and the PUCCH resource carrying the URLLC HARQ-ACK in the time domain, the eMBB HARQ-ACK is not required to avoid due to the low latency of the URLLC HARQ-ACK, and thus, the eMBB HARQ-ACK is still transmitted using the PUCCH resource carrying the eMBB HARQ-ACK at this time. Further, since there is no overlap between the PUCCH resource carrying the URLLC HARQ-ACK and the PUCCH resource carrying the eMBB HARQ-ACK in the time domain, the PUCCH resource carrying the eMBB HARQ-ACK and the PUCCH resource carrying the URLLC HARQ-ACK can be used respectively to transmit the eMBB HARQ-ACK and the URLLC HARQ-ACK within a time domain position of the eMBB PUSCH resource, thereby reducing the missed transmission of the eMBB HARQ-ACK due to directly transmitting the eMBB HARQ-ACK by using the eMBB PUSCH resource in a multiplex manner when there is an overlap between the eMBB HARQ-ACK and the eMBB PUSCH resource in the time domain.

Figure 3:
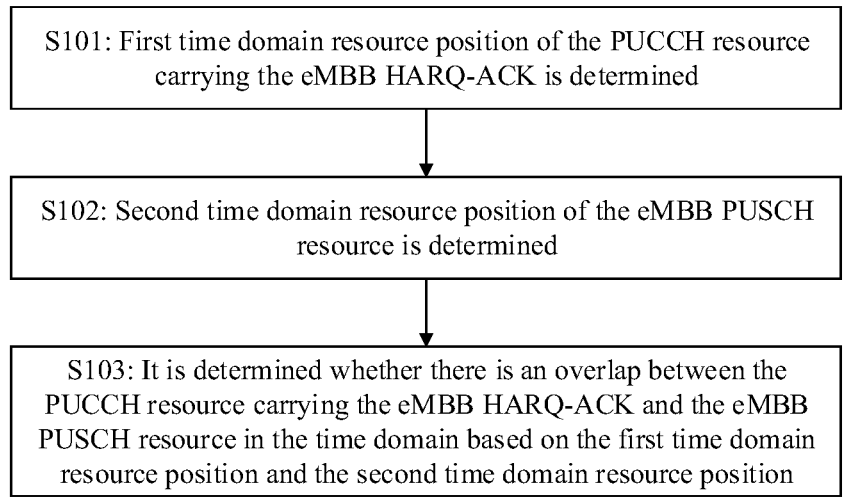
FIG. 3 is a schematic flowchart illustrating a method for determining whether there is an overlap between a PUCCH resource carrying an eMBB HARQ-ACK and an eMBB PUSCH resource in a time domain according to an embodiment of the present disclosure.

As shown in FIG. 3, the method further includes:

S101: a first time domain resource position of the PUCCH resource carrying the eMBB HARQ-ACK is determined;

S102: a second time domain resource position of the eMBB PUSCH resource is determined; and S103: it is determined whether there is an overlap between the PUCCH resource carrying the eMBB HARQ-ACK and the eMBB PUSCH resource in the time domain based on the first time domain resource position and the second time domain resource position.

Since the URLLC service is generally a burst and low-latency service, if there is a need for transmission, it is necessary to schedule a corresponding resource for transmission as soon as possible, it is necessary to know a transmission status of the URLLC in time, and it is necessary to retransmit as soon as possible when the transmission fails. Therefore, a time interval between a delivery moment of a downlink scheduling instruction used by the base station while scheduling a resource carrying the URLLC service and a start moment of scheduling the PUSCH resource carrying the URLLC service or transmitting the URLLC HARQ-ACK is small. However, a delay requirement of the eMBB service is shorter than that of the URLLC service, and thus an interval between a transmission resource carrying the eMBB service and a transmission resource of the eMBB HARQ-ACK is relatively large in the time domain. Therefore, when it is determined that there is a URLLC HARQ-ACK needs to be fed back, the UE can predict in advance whether there is an overlap between the eMBB PUSCH resource and the PUCCH resource carrying the eMBB HARQ-ACK in the time domain based on this resource configuration feature. If there is no overlap in the time domain, the eMBB HARQ-ACK is transmitted on a corresponding PUCCH resource, and whether the eMBB PUSCH resource is dropped depends on whether there is an overlap among the PUCCH resources carrying the URLLC HARQ-ACK the time domain. If there is an overlap between the eMBB PUSCH resource and the PUCCH resource carrying the URLLC HARQ-ACK in the time domain, the eMBB PUSCH resource is dropped or punched.

The first time domain resource position is a position of a time domain resource occupied by the PUCCH resource carrying the eMBB HARQ-ACK, for example, a start moment and an end moment of the PUCCH resource.

The second time domain resource position is a position of a time domain resource occupied by the eMBB PUSCH resource, for example, a start moment and an end moment of the eMBB PUSCH resource.

There are many manners to determine the first time domain resource position and the second time domain resource position. Specifically, the first time domain resource position and the second time domain resource position can be determined according to a scheduling manner of the eMBB physical downlink shared channel (Physical Downlink Shared Channel, PDSCH) and a scheduling manner of the eMBB PUSCH.

For example, in response to dynamic scheduling of the eMBB PDSCH resource, the first time domain resource position is determined according to a downlink scheduling instruction for scheduling the eMBB PDSCH. The downlink scheduling instruction for scheduling the eMBB PDSCH can be carried in downlink control information (Downlink Control Information, DCI) of a physical layer. The DCI will indicate a resource identification of the eMBB PDSCH resource, so that the time domain resource position of the eMBB PDSCH resource can be determined according to the resource identification. At the same time, the downlink scheduling instruction for scheduling the eMBB PDSCH also carries an offset (K1) information field and a PUCCH resource indicator (PUCCH Resource Indicator, PRI). The PUCCH resource indicator indicates a time domain resource set of the PUCCH resource carrying the eMBB HARQ-ACK, and the K1 information field indicates a slot quantity of an interval between between the eMBB PDSCH resource and the PUCCH resource carrying the eMBB HARQ-ACK. Therefore, the PUCCH resource carrying the eMBB HARQ-ACK is determined from the PUCCH resource indicated by the PRI based on the K1, and then the first time domain resource position can be determined.

In response to semi-persistent scheduling of the eMBB PDSCH, the first time domain resource position is determined according to configuration information of the semi-persistent scheduling eMBB PDSCH resource and an activation indication carried by activation DCI.

For example, the configuration information of the eMBB PDSCH resource is delivered by the base station through high level signaling (for example, Radio Resource Control, RCC). The configuration information may include a period of semi-persistent scheduling of the eMBB PDSCH resource. The period of semi-persistent scheduling may have a default start moment. For example, the default start moment of the period of semi-persistent scheduling is a first symbol contained in a slot. The activation DCI may carry an offset of an activation semi-persistent scheduling period, and thus a start moment when the semi-persistent scheduling period is activated can be known according to the offset relative to the default start moment. For another example, the activation DCI may also carry occupation duration of the eMBB PDSCH resource. The first time domain resource position can be determined by combining a relationship among PUCCH resources carrying the eMBB HARQ-ACK corresponding to the semi-persistent scheduling eMBB PDSCH resource.

In the embodiments of the present disclosure, the eMBB HARQ-ACK is feedback information of eMBB service data transmitted on the eMBB PDSCH resource.

Similarly, the eMBB PUSCH resource also has two manners, namely, dynamic scheduling and configured grant scheduling.

For example, in response to the dynamic scheduling of the eMBB PUSCH resource, the second time domain resource position is determined according to an uplink scheduling instruction for scheduling the eMBB PUSCH.

The uplink scheduling instruction may be carried in the DCI, and the DCI may directly indicate the eMBB PUSCH resource. Therefore, the second time domain resource position can be easily and quickly determined according to the uplink scheduling instruction.

In response to the configured grant scheduling of the eMBB PUSCH resource, the second time domain resource position is determined according to configured grant scheduling information.

The configured grant scheduling information is scheduling information generated by performing the configured grant scheduling of the eMBB PUSCH resource. The configured grant scheduling of the eMBB PUSCH resource may include:

a first semi-persistent scheduling manner of the eMBB PUSCH resource; and a second semi-persistent scheduling manner of the eMBB PUSCH resource.

In the first semi-persistent scheduling manner, the configured grant scheduling information is delivered by the base station through the high level signaling, and the configured grant scheduling information includes all scheduling information of the eMBB PUSCH resource, for example, a semi-persistent period of the eMBB PUSCH resource, an offset of the semi-persistent period, and a resource length of the eMBB PUSCH resource.

In the second semi-persistent scheduling manner, an initial configuration of the eMBB PUSCH resource is performed according to the configured grant scheduling information delivered by the base station through the high level signaling, and then the eMBB PUS CH resource is jointly scheduled by combining with the activation DCI delivered by the physical layer. For example, the initial configuration defines the semi-persistent period of the eMBB PUSCH resource. At this time, the activation DCI may carry the offset of the semi-persistent period and the resource length of the eMBB PUSCH resource.

Manners for determining the first time domain resource position and the second time domain resource position are given above, and the specific implementation is not limited to these manners.

Figure 4:
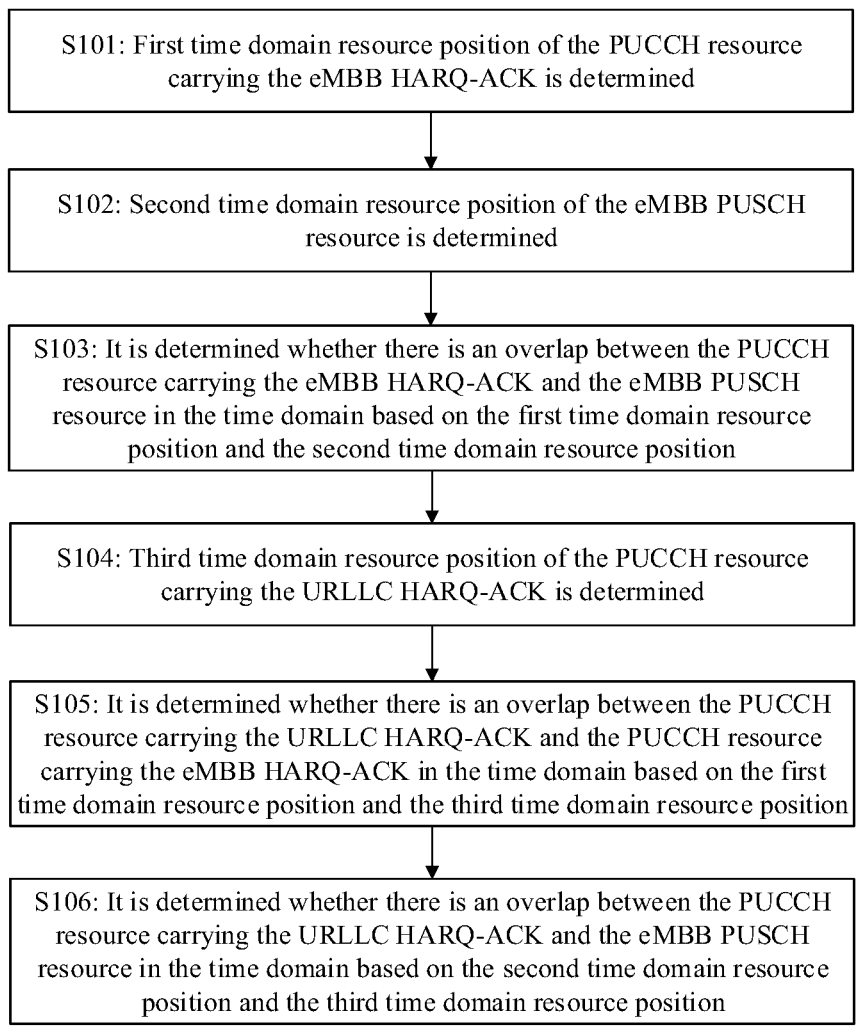
FIG. 4 is a schematic flowchart illustrating a method for determining whether there is an overlap between a PUCCH resource carrying an URLLC HARQ-ACK and a PUCCH resource carrying an eMBB HARQ-ACK and whether there is an overlap between a PUCCH resource carrying an URLLC HARQ-ACK and an eMBB PUSCH resource in a time domain according to an embodiment of the present disclosure.

In some embodiments, the method as shown for example in FIG. 4 further includes:

S104: a third time domain resource position of the PUCCH resource carrying the URLLC HARQ-ACK is determined;

S105: it is determined whether there is an overlap between the PUCCH resource carrying the URLLC HARQ-ACK and the PUCCH resource carrying the eMBB HARQ-ACK in the time domain based on the first time domain resource position and the third time domain resource position; and S106: it is determined whether there is an overlap between the PUCCH resource carrying the URLLC HARQ-ACK and the eMBB PUSCH resource in the time domain based on the second time domain resource position and the third time domain resource position.

Considering information types, for example, both the URLLC HARQ-ACK and the eMBB HARQ-ACK belong to control information, while the eMBB service data belongs to service information. At the same time, considering a difference of service types, the delay requirement of the URLLC service is higher than that of the eMBB. A transmission priority of the URLLC HARQ-ACK, the eMBB HARQ-ACK and the eMBB service data transmitted by the eMBB PUSCH resource is that the transmission priority of the URLLC HARQ-ACK is higher than that of the eMBB HARQ-ACK, and the transmission priority of the eMBB HARQ-ACK is higher than that of the eMBB service data.

After the first time domain resource position and the second time domain resource position are determined, it can be determined whether there is an overlapping relationship among the above three resources in the time domain by comparison. The overlapping relationship in the time domain includes an overlap in the time domain and no overlap in the time domain.

Referring to FIG. 8, FIG. 9, FIG. 10 and FIG. 11, the method further includes:

a determination moment is determined, wherein the determination moment is a moment to determine an overlapping relationship between the PUCCH resource carrying the URLLC HARQ-ACK and the eMBB PUSCH resource and an overlapping relationship between the PUCCH resource carrying the URLLC HARQ-ACK and the PUCCH resource carrying the eMBB HARQ-ACK in the time domain, respectively.

Figure 8:
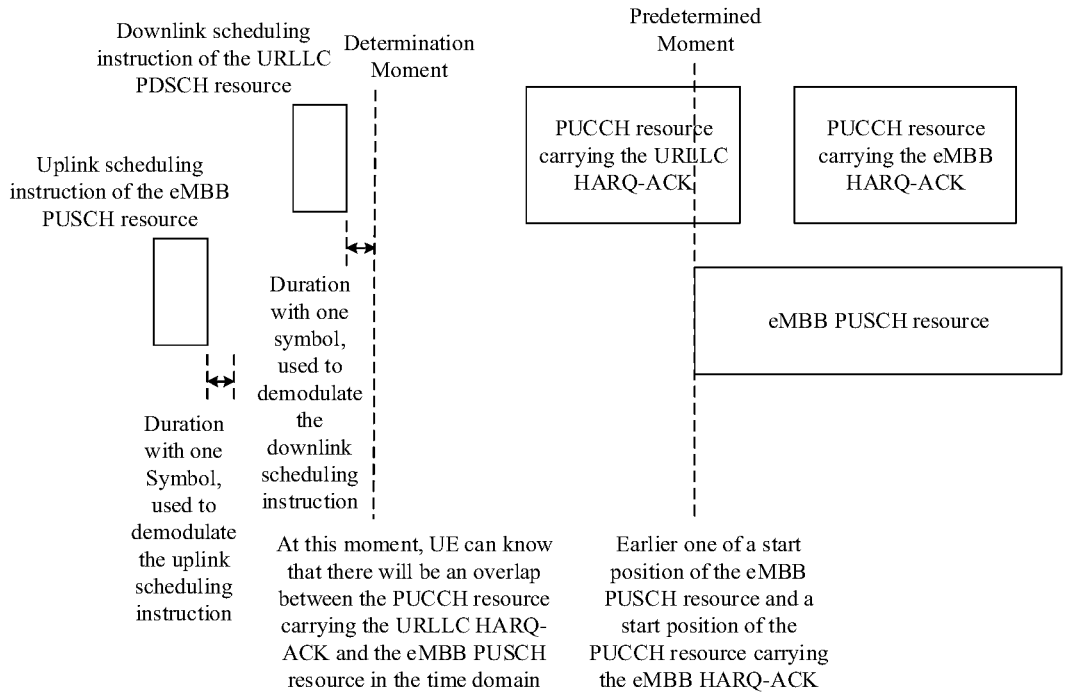
FIG. 8 is a schematic structural diagram illustrating an apparatus for transmitting a HARQ-ACK according to an embodiment of the present disclosure.
Figure 9:
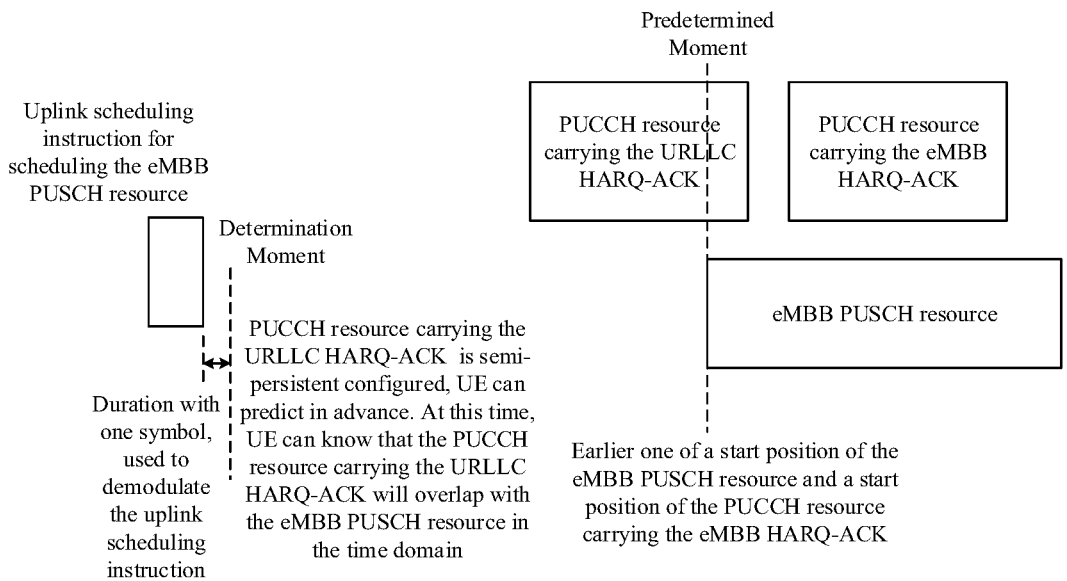
FIG. 9 is a schematic diagram illustrating a time domain relationship among a PUCCH resource carrying an URLLC HARQ-ACK, a PUCCH resource carrying an eMBB HARQ-ACK, and an eMBB PUSCH resource according to an embodiment of the present disclosure.
Figure 10:
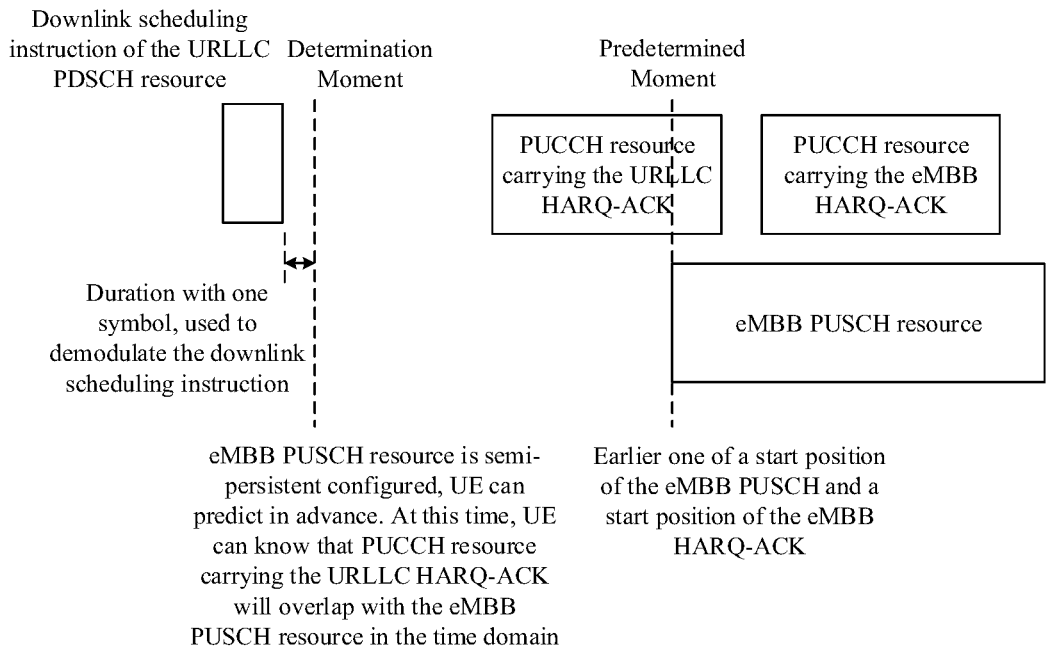
FIG. 10 is a schematic diagram illustrating a time domain relationship among a PUCCH resource carrying an URLLC HARQ-ACK, a PUCCH resource carrying an eMBB HARQ-ACK, and an eMBB PUSCH resource according to an embodiment of the present disclosure.
Figure 11:
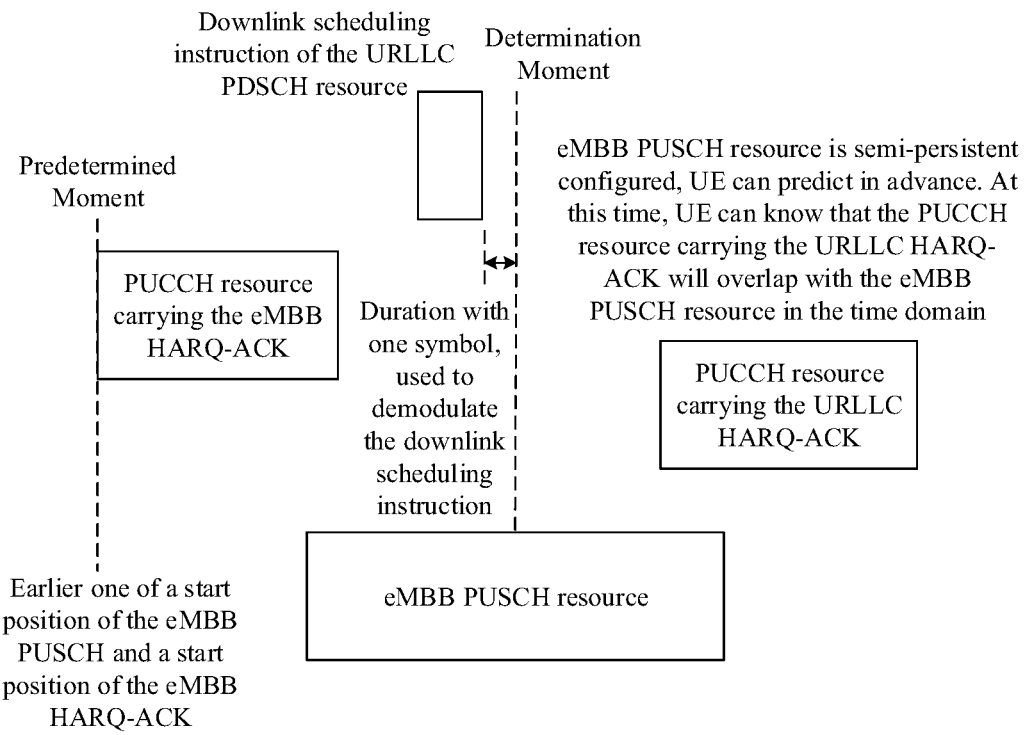
FIG. 11 is a schematic diagram illustrating a time domain relationship among a PUCCH resource carrying an URLLC HARQ-ACK, a PUCCH resource carrying an eMBB HARQ-ACK, and an eMBB PUSCH resource according to an embodiment of the present disclosure.

As shown in FIG. 8, FIG. 9 and FIG. 10, the determination moment is earlier than the predetermined moment. In FIG. 8, the URLLC PDSCH resource is dynamically scheduled through the downlink scheduling instruction; and in FIG. 9, the URLLC PDSCH resource is semi-persistent configured. In FIG. 10, the URLLC PDSCH resource is dynamically scheduled through the downlink scheduling instruction. As shown in FIG. 11, the predetermined moment is earlier than the determination moment. In FIG. 11, the URLLC PDSCH resource is dynamically scheduled through the downlink scheduling instruction.

In some embodiments, the S104 may include:

in response to the dynamic scheduling of the URLLC physical downlink shared channel (PDSCH) resource, the third time domain resource position is determined according to the downlink scheduling instruction for scheduling the URLLC PDSCH resource; and in response to the semi-persistent scheduling of the URLLC PDSCH resource, the third time domain resource position is determined according to configuration information of the semi-persistent scheduling URLLC PDSCH resource and the activation DCI, wherein the activation DCI includes a resource identification of the PUCCH resource carrying the URLLC HARQ-ACK, an offset and a duration of the semi-persistent scheduling URLLC PDSCH resource.

The URLLC HARQ-ACK is feedback information for transmitting the URLLC service data using the URLLC PDSCH resource.

Similarly, the downlink scheduling instruction for scheduling the URLLC PDSCH resource can be carried in the DCI, and the DCI directly carries information such as resource identification information of the URLLC PDSCH resource, resource identification information of the PUCCH resource carrying the URLLC HARQ-ACK, and a slot offset quantity between the URLLC PDSCH resource and the PUCCH resource carrying the URLLC HARQ-ACK, and thus the third time domain resource position can be determined directly according to the downlink scheduling instruction.

The semi-persistent scheduling of the URLLC PDSCH resource is similar to that of the eMBB PDSCH resource, and thus the third time domain resource position can also be determined based on the configuration information delivered by the high layer signaling and the activation DCI.

In some embodiments, the method further includes:

in response to dynamic scheduling of an URLLC PDSCH resource, a determination moment is obtained according to a reception moment and a demodulation duration of an uplink scheduling instruction for scheduling the URLLC PDSCH resource, wherein the demodulation duration is a duration for the UE to demodulate the uplink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

In order to facilitate the base station to know whether the UE can determine the overlapping relationship between the PUCCH resource carrying URLLC HARQ-ACK and the eMBB PUSCH resource and the overlapping relationship between the PUCCH resource carrying URLLC HARQ- ACK and the PUCCH resources carrying eMBB HARQ-ACK in the time domain before the predetermined moment, the demodulation duration is introduced in the embodiments of the present disclosure, and the demodulation duration can be known in advance by both the UE and the base station.

The demodulation duration is a duration jointly determined by the UE and the base station for the UE to demodulate and schedule the uplink scheduling instruction of the URLLC PDSCH resource. Therefore, it is convenient for the base station to determine according to the demodulation duration whether to receive the eMBB HARQ-ACK on the PUCCH resource or receive the eMBB HARQ-ACK on the PUSCH resource when the above situation occurs.

Figure 12:
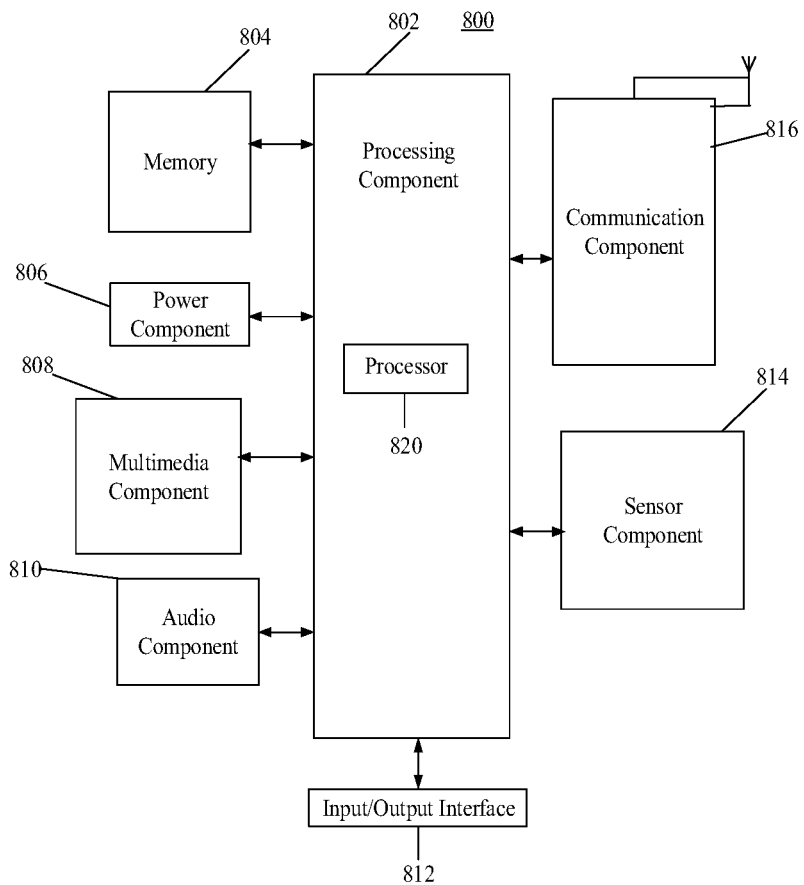
FIG. 12 is a schematic structural diagram illustrating UE according to an embodiment of the present disclosure.

The demodulation duration is a predetermined number of symbols. In the embodiments of the present disclosure, the demodulation duration is accurate to a symbol level, thereby improving the accuracy of the determination. For example, the demodulation duration may be one or two symbols. Referring to FIG. 8 to FIG. 11, the demodulation duration of the DCI dynamically scheduled by the UE may be one symbol. The downlink scheduling instruction of the dynamic scheduling URLLC PDSCH resource shown in FIG. 8 and FIG. 12 are all one symbol.

In some embodiments, the method further includes: the demodulation duration is determined, wherein the determining the demodulation duration includes one of:
 the demodulation duration is determined according to a protocol;
 the demodulation duration is determined according to received configuration information.

For example, the demodulation duration is agreed in a communication protocol, and thus, since contents of the communication protocol are preset, both the UE and the base station can determine the demodulation duration according to the protocol in the communication protocol.

In some embodiments, the UE may report its own demodulation capability information, and thus the base station will estimate the demodulation duration according to the demodulation capability information reported by the UE, and deliver configuration information to the UE according to the estimated demodulation duration. Therefore, the UE can determine its approximate time domain position according to the configuration information, and can determine the overlapping relationship between the PUCCH resource carrying the URLLC HARQ-ACK and the eMBB PUSCH resource and the overlapping relationship between the PUCCH resource carrying the URLLC HARQ-ACK and the PUCCH resource carrying the eMBB HARQ-ACK in the time domain. The specific time domain overlapping relationship is determined by the UE according to the demodulation content, but when selecting resources of the transmitted eMBB HARQ-ACK, it is determined according to a relationship between the determination moment and the predetermined moment, wherein the relationship is determined according to the demodulation duration known by the base station. For example, the relationship between the determination moment and the predetermined moment includes: the determination moment is earlier than the predetermined moment, the determination moment is equal to the predetermined moment, and the determination moment is later than the predetermined moment. If the determination moment is equal to or later than the predetermined moment, even if there is an overlap between the PUCCH resource carrying eMBB HARQ-ACK and the eMBB PUSCH resource in the time domain, and there is an overlap between the PUCCH resource carrying URLLC HARQ-ACK and the eMBB PUSCH resource in the time domain while there is no overlap between the PUCCH resource carrying URLLC HARQ-ACK and the PUCCH resource of the eMBB HARQ-ACK in the time domain, the eMBB HARQ-ACK will also be transmitted by using the eMBB PUSCH resource in a multiplex manner, thereby ensuring the consistency of the base station and the UE in selecting the PUCCH resource or the PUSCH resource to send an eMBB HARQ-ACK confirmation.

In some embodiments, the UE may also determine the demodulation duration according to its own demodulation capability. The UE will report the demodulation capability information indicating its own demodulation capability to the base station, and the base station and the UE convert the demodulation duration based on the demodulation capability information of the UE according to the same determination logic.

In other embodiments, the foregoing configuration information indicating the demodulation duration may be determined by the base station according to recommended durations reported by the UE. For example, the UE converts one or more recommended durations according to its own demodulation capability and reports them to the base station; the base station can randomly select or select a recommended duration according to the current self-set load, and send configuration information indicating the demodulation duration to the UE.

In some embodiments, the method further includes:
 the eMBB PUSCH resource is dropped or punched.

Herein, the "drop" means that the entirety of the eMBB PUSCH resources overlapping with the PUCCH resource carrying the eMBB HARQ-ACK and the URLLC HARQ-ACK in the time domain is discarded.

The "punching the eMBB PUSCH resource" means that a part of the eMBB PUSCH resources overlapping with the PUCCH resource carrying the eMBB HARQ-ACK and the URLLC HARQ-ACK in the time domain respectively is discarded.

Since the eMBB PUSCH resources are used to transmit the eMBB service data, and eMBB service data is usually configured with repeated transmission in order to improve the success rate of reception, when a small number of repeated transmissions are dropped, the base station can still receive all the eMBB data, so even if the eMBB PUSCH resources are dropped, the impact on using the eMBB service data is small.

On the UE side, if the eMBB PUSCH resource is dropped, the eMBB service data will not be sent on a corresponding eMBB PUSCH resource.

Figure 5:
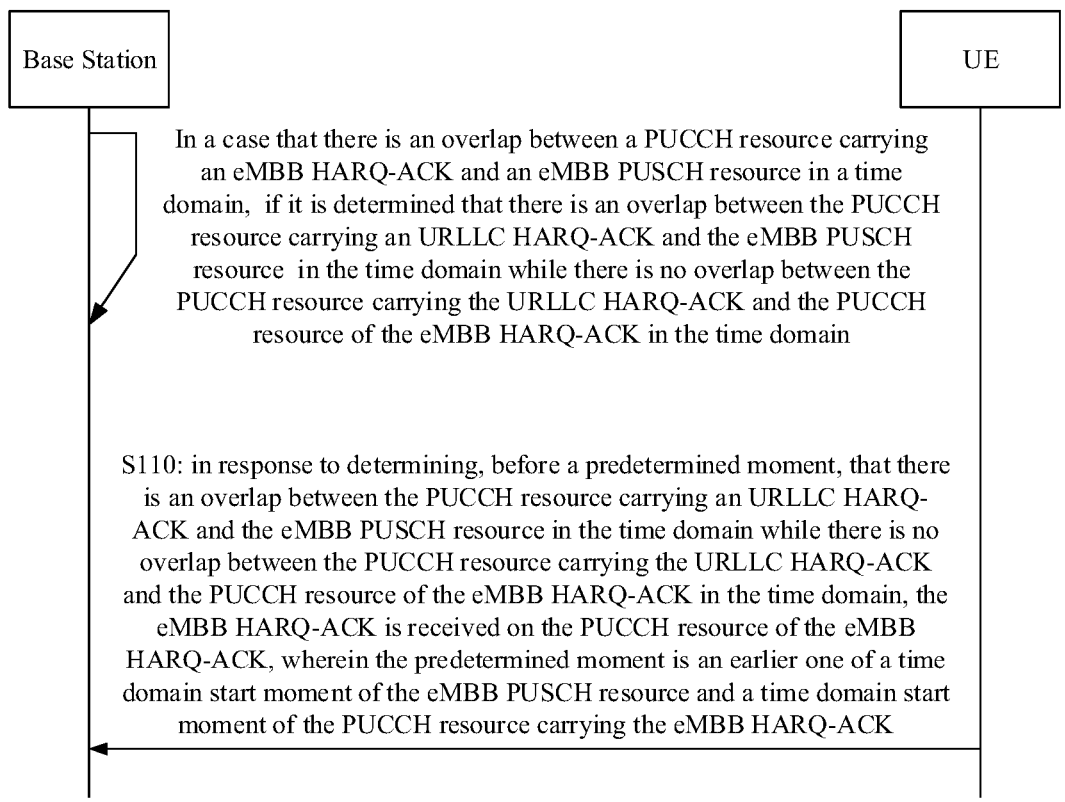
FIG. 5 is a schematic flowchart illustrating a method for transmitting a HARQ-ACK according to an embodiment of the present disclosure.

As shown in FIG. 5, an embodiment of the present disclosure provides a method for transmitting a HARQ-ACK, including:
 in a case that there is an overlap between a PUCCH resource carrying an eMBB HARQ-ACK and an eMBB PUSCH resource in a time domain, in response to determining, before a predetermined moment, that there is an overlap between the PUCCH resource carrying an URLLC HARQ-ACK and the eMBB PUSCH resource in the time domain while there is no overlap between the PUCCH resource carrying the URLLC HARQ-ACK and the PUCCH resource of the eMBB HARQ-ACK in the time domain, it is determined that UE receives the eMBB HARQ-ACK on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK.

The base station determines that the UE can determine the overlapping relationship among the above three resources before the predetermined moment, which can be reported to the base station by the UE after determination, or can be determined by the base station itself. For example, the base station can determine the overlapping relationship based on a calculation logic known to the UE for calculating the predetermined moment in the foregoing embodiments.

The method further includes: a first time domain resource position of the PUCCH resource carrying the eMBB HARQ-ACK is determined; a second time domain resource position of the eMBB PUSCH resource is determined; and it is determined whether there is an overlap between the PUCCH resource carrying the eMBB HARQ-ACK and the eMBB PUSCH resource in the time domain based on the first time domain resource position and the second time domain resource position.

In some embodiments, the method further includes: the third time domain resource position of the PUCCH resource carrying the URLLC HARQ-ACK is determined; it is determined whether there is an overlap between the PUCCH resource carrying the URLLC HARQ-ACK and the PUCCH resource carrying the eMBB HARQ-ACK in the time domain based on the first time domain resource position and the third time domain resource position; and it is determined whether there is an overlap between the PUCCH resource carrying the URLLC HARQ-ACK and the eMBB PUSCH resource in the time domain based on the second time domain resource position and the third time domain resource position.

Herein, manners for determining the overlapping relationship among the first time domain resource position, the second time domain resource position and the third time domain resource position in the time domain by the base station are the same as that for determining by the UE, and will not be repeated here.

In some embodiments, the determining the third time domain resource position of the PUCCH resource carrying the URLLC HARQ-ACK includes: in response to the dynamic scheduling of the URLLC physical downlink shared channel (PDSCH) resource, the third time domain resource position is determined according to the downlink scheduling instruction for scheduling the URLLC PDSCH resource; and in response to the semi-persistent scheduling of the URLLC PDSCH resource, the third time domain resource position is determined according to configuration information of the semi-persistent scheduling URLLC PDSCH resource and the activation DCI, wherein the activation DCI includes a resource identification of the PUCCH resource carrying the URLLC HARQ-ACK, an offset and a duration of the semi-persistent scheduling URLLC PDSCH resource.

Similarly, manners for determining the third time domain resource position by the base station may be the same as that for determining the third time domain resource position by the UE.

In other embodiments, the base station is a scheduler of various resources, when scheduling the resources, the base station can determine the first time domain resource position, the second time domain resource position and the third time domain resource position without determining them based on its own higher layer signaling and the activation DCI.

However, when determining the determination moment of the UE, if the URLLC PDSCH resource is dynamically configured, the base station needs to determine the determination moment of the UE by combining the high layer signaling delivered by itself and the delivery of the activation DCI. For example, the method further includes:

in response to dynamic scheduling of an URLLC physical downlink shared channel (PDSCH) resource, a determination moment of the UE is obtained according to a delivery moment and a demodulation duration of an uplink scheduling instruction for scheduling the URLLC PDSCH resource, wherein the demodulation duration is a duration for the UE to demodulate the uplink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

In the embodiments of the present disclosure, the manner for determining the determination moment is known by both the base station and the terminal, and thus, when the base station and the terminal use the same manner to determine the determination moment, a result that whether the determination moment of the terminal obtained by the base station and the terminal is earlier than the predetermined moment is the same. Therefore, the terminal and the base station can know whether to transmit the eMBB HARQ-ACK on the PUCCH resource or the PUSCH resource without negotiation.

The demodulation duration is a predetermined number of symbols.

The method further includes: the demodulation duration is determined, wherein the determining the demodulation duration includes one of the following:
    the demodulation duration is determined according to a protocol;
    the demodulation duration is determined according to capability information reported by the UE;
    the demodulation duration is determined according to configuration information delivered to the UE.

If the demodulation duration is determined according to the configuration information, the base station needs to deliver configuration information indicating the demodulation duration to the UE.

In some embodiments, the method further includes:
    the eMBB PUSCH resource is dropped or punched.

On the base station side, if the eMBB PUSCH resource is dropped, the eMBB service data is not received on a corresponding eMBB PUSCH resource.

If the eMBB PUSCH resource is dropped, the base station will not perform data reception on the dropped eMBB PUSCH resource.

Figure 6:
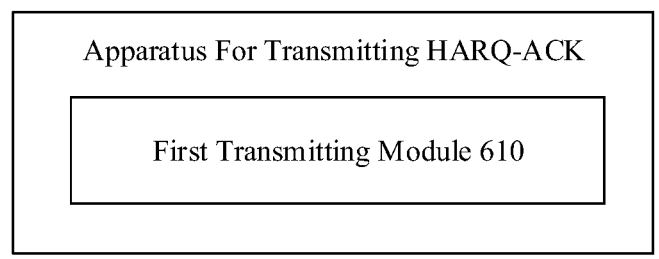
FIG. 6 is a schematic structural diagram illustrating an apparatus for transmitting a HARQ-ACK according to an embodiment of the present disclosure.

As shown in FIG. 6, an embodiment of the present disclosure provides an apparatus for transmitting a HARQ-ACK, performed by user equipment (UE), including:
    a first transmitting module 610 configured to, in a case that there is an overlap between a PUCCH resource carrying an eMBB HARQ-ACK and an eMBB PUSCH resource in a time domain, in response to determining, before a predetermined moment, that there is an overlap between the PUCCH resource carrying an URLLC HARQ-ACK and the eMBB PUSCH resource in the time domain while there is no overlap between the PUCCH resource carrying the URLLC HARQ-ACK and the PUCCH resource of the eMBB HARQ-ACK in the time domain, transmit the eMBB HARQ-ACK on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK.

Based on the foregoing solution, the apparatus further includes:
- a first determining module configured to determine a first time domain resource position of the PUCCH resource carrying the eMBB HARQ-ACK;
- a second determining module configured to determine a second time domain resource position of the eMBB PUSCH resource; and
- a third determining module configured to determine whether there is an overlap between the PUCCH resource carrying the eMBB HARQ-ACK and the eMBB PUSCH resource in the time domain based on the first time domain resource position and the second time domain resource position.

Based on the foregoing solution, the apparatus further includes:
- a fourth determining module configured to determine a third time domain resource position of the PUCCH resource carrying the URLLC HARQ-ACK; and
- a fifth determining module configured to determine whether there is an overlap between the PUCCH resource carrying the URLLC HARQ-ACK and the PUCCH resource carrying the eMBB HARQ-ACK in the time domain based on the first time domain resource position and the third time domain resource position; and
- to determine whether there is an overlap between the PUCCH resource carrying the URLLC HARQ-ACK and the eMBB PUSCH resource in the time domain based on the second time domain resource position and the third time domain resource position.

Based on the foregoing solution, the apparatus further includes:
- a first obtaining module configured to, in response to dynamic scheduling of an URLLC physical downlink shared channel (PDSCH) resource, obtain a determination moment according to a reception moment and a demodulation duration of an uplink scheduling instruction for scheduling the URLLC PDSCH resource, wherein the demodulation duration is a duration for the UE to demodulate the uplink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

Based on the foregoing solution, the demodulation duration is a predetermined number of symbols.

Based on the foregoing solution, the apparatus further includes:
- a sixth determining module configured to determine the demodulation duration, wherein the determining the demodulation duration includes one of:
- determining the demodulation duration according to a protocol;
- determining the demodulation duration according to received configuration information.

Based on the foregoing solution, the apparatus further includes:
- a first resource processing module configured to drop or punch the eMBB PUSCH resource.

Figure 7:
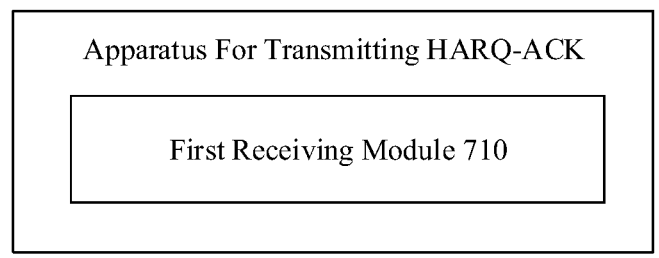
FIG. 7 is a schematic structural diagram illustrating an apparatus for transmitting a HARQ-ACK according to an embodiment of the present disclosure.

As shown in FIG. 7, an embodiment of the present disclosure provides an apparatus for transmitting a HARQ-ACK, performed by a base station, including:
- a first receiving module 710 configured to, in a case that there is an overlap between a PUCCH resource carrying an eMBB HARQ-ACK and an eMBB PUSCH resource in a time domain, in response to determining, before a predetermined moment, that there is an overlap between the PUCCH resource carrying an URLLC HARQ-ACK and the eMBB PUSCH resource in the time domain while there is no overlap between the PUCCH resource carrying the URLLC HARQ-ACK and the PUCCH resource of the eMBB HARQ-ACK in the time domain, determine that UE receives the eMBB HARQ-ACK on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK.

In some embodiments, the apparatus performed by the base station for transmitting the HARQ-ACK further includes:
- a seventh determining module configured to determine a first time domain resource position of the PUCCH resource carrying the eMBB HARQ-ACK;
- an eighth determining module configured to determine a second time domain resource position of the eMBB PUSCH resource; and
- a ninth determining module configured to determine whether there is an overlap between the PUCCH resource carrying the eMBB HARQ-ACK and the eMBB PUSCH resource in the time domain based on the first time domain resource position and the second time domain resource position.

The apparatus performed by the base station for transmitting the HARQ-ACK further includes:
- a tenth determining module configured to determine a third time domain resource position of the PUCCH resource carrying the URLLC HARQ-ACK;
- an eleventh determining module configured to determine whether there is an overlap between the PUCCH resource carrying the URLLC HARQ-ACK and the PUCCH resource carrying the eMBB HARQ-ACK in the time domain based on the first time domain resource position and the third time domain resource position; and whether there is an overlap between the PUCCH resource carrying the URLLC HARQ-ACK and the eMBB PUSCH resource in the time domain based on the second time domain resource position and the third time domain resource position.

Based on the foregoing solution, the apparatus further includes:
- a second obtaining module configured to, in response to dynamic scheduling of an URLLC physical downlink shared channel (PDSCH) resource, obtain a determination moment of the UE according to a delivery moment and a demodulation duration of an uplink scheduling instruction for scheduling the URLLC PDSCH resource, wherein the demodulation duration is a duration for the UE to demodulate the uplink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

Based on the foregoing solution, the apparatus further includes:

a second resource processing module configured to drop or punch the eMBB PUSCH resource.

Several examples will be provided below in combination with any abovementioned embodiments.

Example 1

This example proposes a method for transmitting an eMBB HARQ-ACK. In a scenario that a PUCCH resource carrying an URLLC HARQ-ACK and a PUCCH resource carrying an eMBB HARQ-ACK overlap with a eMBB PUSCH resource in a time domain, respectively, and the PUCCH resource carrying the URLLC HARQ-ACK does not overlap with the PUCCH resource carrying the eMBB HARQ-ACK in the time domain, an earlier one of a start moment of the eMBB PUSCH resource and a start moment of the PUCCH resource carrying the eMBB HARQ-ACK is selected. If the UE can already determine that there will be an overlap between the PUCCH resource carrying the URLLC HARQ-ACK and the eMBB PUSCH resource before the earlier start moment, the UE will use the PUCCH resource to transmit the eMBB HARQ-ACK instead of transmitting the eMBB HARQ-ACK by using the eMBB PUSCH resource in a multiplex manner.

By adopting the above method for transmitting the eMBB HARQ-ACK can reduce the dropping or partially dropping of the eMBB HARQ-ACK can be reduced in the above specific scenario, so that the base station can correctly receive the eMBB HARQ-ACK fed back by the UE, thereby reducing retransmission of unnecessary eMBB data.

Example 2

When the UE can determine a time domain resource position of the PUCCH resource carrying the URLLC HARQ-ACK and can determine a time domain resource position of the eMBB PUSCH resource, the UE can determine whether the URLLC HARQ-ACK will overlap with the eMBB PUSCH by comparing the time domain resource position of the PUCCH resource carrying the URLLC HARQ-ACK with that of the eMBB PUSCH resource.

A specific determination manner may be determined according to a scheduling manner of the URLLC PDSCH and/or the eMBB PUSCH.

in response to dynamic scheduling of the URLLC PDSCH:

the UE will receive a downlink scheduling instruction (DL grant) for scheduling the PDSCH at the same time or before receiving the information transmitted by the PDSCH resource. The downlink scheduling instruction may be a kind of DCI.

A time-frequency resource position of the PUCCH resource carrying the HARQ-ACK corresponding to the PDSCH resource will be indicated in the downlink scheduling instruction. Therefore, after successfully demodulating the downlink scheduling instruction for scheduling the transmission of the URLLC PDSCH resource, the time domain resource position of the PUCCH resource carrying the URLLC HARQ-ACK. The time required for the UE to successfully demodulate the downlink scheduling instruction may be agreed in a protocol, or the base station may configure the UE after the UE reports capability information of the UE to the base station. For example, it can be agreed or configured that the UE can successfully demodulate the downlink scheduling instruction within one symbol after the PDCCH resource carrying the downlink scheduling instruction.

In response to configured grant scheduling of the eMBB PUSCH resource: the time-frequency resource position of the eMBB PUSCH resource can be predicted in advance by the base station and the UE. That is, in response to semi-persistent scheduling of the URLLC PDSCH resource: both the time-frequency domain position of the PDSCH resource and the time-frequency domain position of the HARQ-ACK PUCCH resource can be predicted in advance by the base station and the UE. For another example, in response to a static configuration of the URLLC PDSCH resource, both the time-frequency domain position of the PDSCH resource and the time-frequency domain position of the HARQ-ACK PUCCH resource can also be predicted in advance by the base station and the UE.

Example 3

Referring to FIG. 8, in the scenarios of dynamic scheduling eMBB PUSCH resource and dynamic scheduling URLLC PDSCH resource, if a moment that there is an overlap between the PUCCH resource carrying URLLC HARQ-ACK and the eMBB PUSCH resource is earlier than an earlier one of a start moment of the eMBB PUSCH resource and a start moment of the PUCCH resource carrying the eMBB HARQ-ACK can be known by the UE, the UE will use the PUCCH resource to transmit the eMBB HARQ-ACK instead of transmitting the eMBB HARQ-ACK by using the eMBB PUSCH resource in a multiplex manner. Meanwhile, the eMBB PUSCH will be dropped or punched.

Example 4

As shown in FIG. 9, in the scenarios of dynamic scheduling eMBB PUSCH resource and semi-persistent scheduling URLLC PDSCH resource, if a moment that there is an overlap between the PUCCH resource carrying URLLC HARQ-ACK and the eMBB PUSCH resource is earlier than an earlier one of a start moment of the eMBB PUSCH resource and a start moment of the PUCCH resource carrying the eMBB HARQ-ACK can be known by the UE, the UE will use the PUCCH resource to transmit the eMBB HARQ-ACK instead of transmitting the eMBB HARQ-ACK by using the eMBB PUSCH resource in a multiplex manner. Meanwhile, the eMBB PUSCH will be dropped.

Example 5

As shown in FIG. 10, in the scenarios of semi-persistent scheduling eMBB PUSCH resource and dynamic scheduling URLLC PDSCH resource, if a moment that there is an overlap between the PUCCH resource carrying URLLC HARQ-ACK and the eMBB PUSCH resource is earlier than an earlier one of a start moment of the eMBB PUSCH resource and a start moment of the PUCCH resource carrying the eMBB HARQ-ACK can be known by the UE, the UE will use the PUCCH resource to transmit the eMBB HARQ-ACK instead of transmitting the eMBB HARQ-ACK by using the eMBB PUSCH resource in a multiplex manner. Meanwhile, the eMBB PUSCH will be dropped or punched.

Example 6

As shown in FIG. 11, in the scenarios of semi-persistent scheduling eMBB PUSCH resource and dynamic scheduling URLLC PDSCH resource, if a moment that there is an overlap between the PUCCH resource carrying URLLC HARQ-ACK and the eMBB PUSCH resource is later than an earlier one of a start moment of the eMBB PUSCH resource and a start moment of the PUCCH resource carrying the eMBB HARQ-ACK can be known by the UE, in this case, the UE will transmit the eMBB HARQ-ACK by using the eMBB PUSCH resource in a multiplex manner according to a protocol in existing protocols, drop the PUCCH resource carrying the eMBB HARQ-ACK, and then perform corresponding dropping or punching operations after learning that the PUCCH resource carrying the URLLC HARQ-ACK overlaps with the eMBB PUSCH resource in the time domain.

FIG. 12 is UE according to an exemplary embodiment. For example, the UE may be a mobile telephone, a computer, a digital broadcasting UE, a message receiving and transmitting device, a game console, a tablet device, a medical device, a fitness device, a personal digital assistant, and so on.

Referring to FIG. 12, the UE 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls overall operations of the UE 800, such as operations associated with display, phone calls, data communications, camera operations, and recording operations. The processing component 802 may include one or more processors 820 to execute instructions to complete all or part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is to store various types of data to support the operation of the UE 800. Examples of such data include instructions for any application or method operated on the UE 800, contact data, phonebook data, messages, pictures, videos, and so on. The memory 804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 806 provides power to different components of the UE 800. The power supply component 806 may include a power management system, one or more power supplies, and other components associated with generating, managing, and distributing power for the UE 800.

The multimedia component 808 includes a screen providing an output interface between the UE 800 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some embodiments, the multimedia component 808 may include a front camera and/or a rear camera. The front camera and/or rear camera may receive external multimedia data when the UE 800 is in an operating mode, such as a photographing mode or a video mode. Each of the front camera and the rear camera may be a fixed optical lens system or have focal length and optical zooming capability.

The audio component 810 is configured to output and/or input an audio signal. For example, the audio component 810 includes a microphone (MIC). When the UE 800 is in an operating mode, such as a call mode, a recording mode, and a voice recognition mode, the MIC is to receive an external audio signal. The received audio signal may be further stored in the memory 804 or sent via the communication component 816. In some embodiments, the audio component 810 further includes a speaker to output an audio signal.

The I/O interface 812 may provide an interface between the processing component 802 and peripheral interface modules. The above peripheral interface modules may include a keyboard, a click wheel, buttons and so on. These buttons may include, but are not limited to, a home button, a volume button, a starting button and a locking button.

The sensor component 814 includes one or more sensors to provide status assessments of various aspects for the UE 800. For example, the sensor component 814 may detect the on/off status of the UE 800, and relative positioning of component, for example, the component is a display and a keypad of the UE 800. The sensor component 814 may also detect a change in position of the UE 800 or a component of the UE 800, a presence or absence of the contact between a user and the UE 800, an orientation or an acceleration/deceleration of the UE 800, and a change in temperature of the UE 800. The sensor component 814 may include a proximity sensor to detect the presence of a nearby object without any physical contact. The sensor component 814 may further include an optical sensor, such as a Complementary Metal-Oxide-Semiconductor (CMOS) or Charged Coupled Device (CCD) image sensor which is used in imaging applications. In some embodiments, the sensor component 814 may further include an acceleration sensor, a gyroscope sensor, a magnetic sensor, a pressure sensor, or a temperature sensor.

The communication component 816 is to facilitate wired or wireless communication between the UE 800 and other devices. The UE 800 may access a wireless network that is based on a communication standard, such as Wi-Fi, 2G or 3G, or a combination thereof. In an exemplary embodiment, the communication component 816 receives a broadcast signal or broadcast-associated information from an external broadcast management system via a broadcast channel In an exemplary embodiment, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an exemplary embodiment, the UE 800 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an exemplary embodiment, there is also provided a non-transitory computer-readable storage medium including instructions, such as the memory 804 including instructions. The instructions may be executed by the processor 820 of the UE 800 to perform the above described methods. For example, the non-transitory computer-readable storage medium may be a ROM, a Random Access Memory (RAM), a CD-ROM, a magnetic tape, a floppy disk, an optical data storage device, etc.

Figure 13:
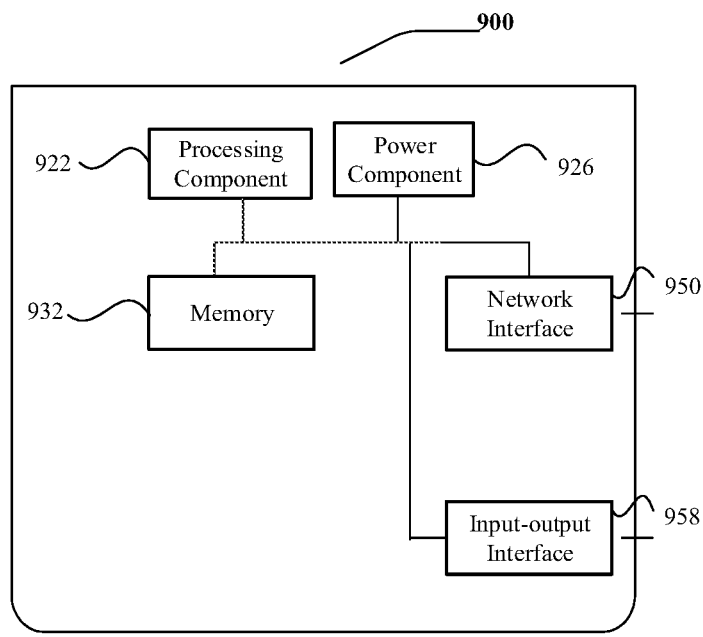
FIG. 13 is a schematic structural diagram illustrating a base station according to an embodiment of the present disclosure.

FIG. 13 is a schematic diagram of a base station. Referring to FIG. 13, the base station 900 includes a processing component 922, which further includes one or more processors, and a memory resource represented by a memory 932 for storing instructions executable by the processing component 922, such as application programs. The application program stored in the memory 932 may include one or more modules each corresponding to a set of instructions. In addition, the processing component 922 is configured to execute instructions to perform the methods for transmitting a HARQ-ACK.

The base station 900 may also include a power component 926 configured to perform power management of the base station 900, a wired or wireless network interface 950 configured to connect the base station 900 to the network, and an input-output (I/O) interface 958. The base station 900 can operate based on an operating system stored in the memory 932, such as Windows Server™, Mac OS X™, Unix™, Linux™, Free BSD™, or the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method for transmitting a hybrid automatic repeat request acknowledgement (HARQ-ACK), performed by user equipment (UE), comprising:
in a case that there is an overlap between a physical uplink control channel (PUCCH) resource carrying an enhanced mobile broadband (eMBB) HARQ-ACK and an eMBB physical uplink shared channel (PUSCH) resource in a time domain, in response to determining, before a predetermined moment, that there is an overlap between the PUCCH resource carrying an ultra reliable and low latency communication (URLLC) HARQ-ACK and the eMBB PUSCH resource in the time domain while there is no overlap between the PUCCH resource carrying the URLLC HARQ-ACK and the PUCCH resource of the eMBB HARQ-ACK in the time domain, transmitting the eMBB HARQ-ACK on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK;

wherein the method further comprises:
in response to dynamic scheduling of an URLLC physical downlink shared channel (PDSCH) resource, obtaining a determination moment according to a reception moment and a demodulation duration of a downlink scheduling instruction for scheduling the URLLC PDSCH resource, wherein the demodulation duration is a duration for the UE to demodulate the downlink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

2. The method according to claim 1, further comprising:
determining a first time domain resource position of the PUCCH resource carrying the eMBB HARQ-ACK;
determining a second time domain resource position of the eMBB PUSCH resource; and
determining whether there is an overlap between the PUCCH resource carrying the eMBB HARQ-ACK and the eMBB PUSCH resource in the time domain based on the first time domain resource position and the second time domain resource position.

3. The method according to claim 2, further comprising:
determining a third time domain resource position of the PUCCH resource carrying the URLLC HARQ-ACK;
determining whether there is an overlap between the PUCCH resource carrying the URLLC HARQ-ACK and the PUCCH resource carrying the eMBB HARQ-ACK in the time domain based on the first time domain resource position and the third time domain resource position; and
determining whether there is an overlap between the PUCCH resource carrying the URLLC HARQ-ACK and the eMBB PUSCH resource in the time domain based on the second time domain resource position and the third time domain resource position.

4. The method according to claim 1, wherein the demodulation duration is a predetermined number of symbols.

5. The method according to claim 1, further comprising:
determining the demodulation duration,
wherein the determining the demodulation duration comprises one of:
determining the demodulation duration according to a protocol;
determining the demodulation duration according to received configuration information.

6. The method according to claim 1, further comprising:
dropping or punching the eMBB PUSCH resource.

7. A method for transmitting a HARQ-ACK, performed by a base station, comprising:
in a case that there is an overlap between a physical uplink control channel (PUCCH) resource carrying an enhanced mobile broadband (eMBB) HARQ-ACK and an eMBB physical uplink shared channel (PUSCH) resource in a time domain, in response to determining that a user equipment (UE) determines, before a predetermined moment, that there is an overlap between the PUCCH resource carrying an ultra reliable and low latency communication (URLLC) HARQ-ACK and the eMBB PUSCH resource in the time domain while there is no overlap between the PUCCH resource carrying the URLLC HARQ-ACK and the PUCCH resource of the eMBB HARQ-ACK in the time domain, receiving the eMBB HARQ-ACK transmitted by the UE on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK;

wherein the method further comprises:

in response to dynamic scheduling of an URLLC physical downlink shared channel (PDSCH) resource, obtaining a determination moment of the UE according to a delivery moment and a demodulation duration of a downlink scheduling instruction for scheduling the URLLC PDSCH resource, wherein the demodulation duration is a duration for the UE to demodulate the downlink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

8. The method according to claim 7, further comprising:

determining a first time domain resource position of the PUCCH resource carrying the eMBB HARQ-ACK;

determining a second time domain resource position of the eMBB PUSCH resource; and determining whether there is an overlap between the PUCCH resource carrying the eMBB HARQ-ACK and the eMBB PUSCH resource in the time domain based on the first time domain resource position and the second time domain resource position.

9. The method according to claim 8, further comprising:

determining a third time domain resource position of the PUCCH resource carrying the URLLC HARQ-ACK;

determining whether there is an overlap between the PUCCH resource carrying the URLLC HARQ-ACK and the PUCCH resource carrying the eMBB HARQ-ACK in the time domain based on the first time domain resource position and the third time domain resource position; and determining whether there is an overlap between the PUCCH resource carrying the URLLC HARQ-ACK and the eMBB PUSCH resource in the time domain based on the second time domain resource position and the third time domain resource position.

10. The method according to claim 7, further comprising:

dropping or punching the eMBB PUSCH resource.

11. A communication device, comprising:

a transceiver;

a memory; and a processor, respectively connected to the transceiver and the memory, for controlling the transceiver to send and receive wireless signals by executing computer-executable instructions stored in the memory, and performing the following operations:

in a case that there is an overlap between a physical uplink control channel (PUCCH) resource carrying an enhanced mobile broadband (eMBB) HARQ-ACK and an eMBB physical uplink shared channel (PUSCH) resource in a time domain, in response to determining, before a predetermined moment, that there is an overlap between the PUCCH resource carrying an ultra reliable and low latency communication (URLLC) HARQ-ACK and the eMBB PUSCH resource in the time domain while there is no overlap between the PUCCH resource carrying the URLLC HARQ-ACK and the PUCCH resource of the eMBB HARQ-ACK in the time domain, transmitting the eMBB HARQ-ACK on the PUCCH resource of the eMBB HARQ-ACK, wherein the predetermined moment is an earlier one of a time domain start moment of the eMBB PUSCH resource and a time domain start moment of the PUCCH resource carrying the eMBB HARQ-ACK;

wherein the operations further comprises:

in response to dynamic scheduling of an URLLC physical downlink shared channel (PDSCH) resource, obtaining a determination moment according to a reception moment and a demodulation duration of a downlink scheduling instruction for scheduling the URLLC PDSCH resource, wherein the demodulation duration is a duration for the UE to demodulate the downlink scheduling instruction, and the determination moment is a moment to determine an overlapping relationship between the PUCCH resource of the URLLC HARQ-ACK and the PUCCH resource carrying the eMBB HARQ-ACK and an overlapping relationship between the PUCCH resource of the URLLC HARQ-ACK and the eMBB PUSCH resource in the time domain.

* * * * *

UNITED STATES PATENT AND TRADEMARK OFFICE
CERTIFICATE OF CORRECTION

PATENT NO. : 12,167,402 B2
APPLICATION NO. : 17/774015
DATED : December 10, 2024
INVENTOR(S) : Mingju Li Page 1 of 1

It is certified that error appears in the above-identified patent and that said Letters Patent is hereby corrected as shown below:

In the Specification

In Column 1, Lines 29-30, delete "Augment" and insert -- Augmented --, therefor.

In Column 1, Line 33, delete "Boardband" and insert -- Broadband --, therefor.

In Column 9, Line 48, delete "station on" and insert -- station using --, therefor.

In Column 12, Line 10, delete "between between" and insert -- between --, therefor.

In Column 13, Line 13, delete "PUS CH" and insert -- PUSCH --, therefor.

In Column 24, Line 39, delete "Charged" and insert -- Charge --, therefor.

Signed and Sealed this
Eleventh Day of March, 2025

Coke Morgan Stewart
*Acting Director of the United States Patent and Trademark Office*